(12) United States Patent
Hu

(10) Patent No.: US 11,614,658 B2
(45) Date of Patent: Mar. 28, 2023

(54) VERTICAL ALIGNMENT LIQUID CRYSTAL DISPLAY MODULE COMPRISING AN IMAGE COLOR SWITCH FILM HAVING AN AVERAGE TRANSMITTANCE OF A VISIBLE LIGHT SPECTRUM FOR SHORT AND LONG WAVELENGTHS OF THE VISIBLE LIGHT

(71) Applicant: Chung-Ming Hu, Tainan (TW)

(72) Inventor: Chung-Ming Hu, Tainan (TW)

(*) Notice: Subject to any disclaimer, the term of this patent is extended or adjusted under 35 U.S.C. 154(b) by 0 days.

(21) Appl. No.: 17/725,566

(22) Filed: Apr. 21, 2022

(65) Prior Publication Data

US 2022/0342243 A1    Oct. 27, 2022

Related U.S. Application Data

(60) Provisional application No. 63/177,942, filed on Apr. 21, 2021.

(30) Foreign Application Priority Data

Dec. 8, 2021    (TW) .................................. 110145813

(51) Int. Cl.
*G02F 1/13363* (2006.01)
*G02F 1/1337* (2006.01)
*G02F 1/1335* (2006.01)

(52) U.S. Cl.
CPC ........ *G02F 1/13363* (2013.01); *G02F 1/1337* (2013.01); *G02F 1/133531* (2021.01)

(58) Field of Classification Search
CPC ......... G02F 1/133631; G02F 1/133738; G02F 2203/055; G02F 2203/04; G02F 1/133521; G02F 1/133637; G02F 1/133624; G02F 1/13473; G02F 2203/05
See application file for complete search history.

(56) References Cited

U.S. PATENT DOCUMENTS

| | | | | |
|---|---|---|---|---|
| 2007/0247567 A1* | 10/2007 | Sato | .................. | G02F 1/133509 359/885 |
| 2010/0020273 A1* | 1/2010 | Toyama | .............. | G02F 1/13363 359/489.07 |
| 2020/0192165 A1* | 6/2020 | Hasegawa | ............ | G02B 5/3083 |

FOREIGN PATENT DOCUMENTS

| CN | 102933994 | 2/2013 |
|---|---|---|
| CN | 103676288 | 3/2014 |

(Continued)

OTHER PUBLICATIONS

"Office Action of Taiwan Counterpart Application", dated Jan. 9, 2023, p. 1-p. 14.

*Primary Examiner* — Paul C Lee
(74) *Attorney, Agent, or Firm* — JCIPRNET

(57) ABSTRACT

A vertical alignment liquid crystal display module including a vertical alignment liquid crystal display panel and an image color switch film is provided. The image color switch film is disposed on the vertical alignment liquid crystal display panel. In various viewing angle directions having included angles of 60 degrees to 75 degrees with respect to a normal of the image color switch film, the image color switch film has a following optical characteristic: an average transmittance of a visible light transmittance spectrum of the image color switch film at an end of short wavelength is less than an average transmittance of the visible light transmittance spectrum of the image color switch film at an end of long wavelength.

31 Claims, 15 Drawing Sheets

(56) References Cited

FOREIGN PATENT DOCUMENTS

TW   200523631   7/2005
WO   2014056246   4/2014

* cited by examiner

VERTICAL ALIGNMENT LIQUID CRYSTAL DISPLAY MODULE COMPRISING AN IMAGE COLOR SWITCH FILM HAVING AN AVERAGE TRANSMITTANCE OF A VISIBLE LIGHT SPECTRUM FOR SHORT AND LONG WAVELENGTHS OF THE VISIBLE LIGHT

CROSS-REFERENCE TO RELATED APPLICATION

This application claims the priority benefit of U.S. provisional application Ser. No. 63/177,942, filed on Apr. 21, 2021, and Taiwan application serial no. 110145813, filed on Dec. 8, 2021. The entirety of each of the above-mentioned patent applications is hereby incorporated by reference herein and made a part of this specification.

BACKGROUND

Technology Field

The disclosure relates to a display module, and particularly to a vertical alignment liquid crystal display module.

Description of Related Art

When LCD displays are operating, although in wide viewing angle technologies, such as vertical alignment (VA) or in-plane switching (IPS), materials such as compensation films or retardation films are used to compensate for color shifts caused by large viewing angles, it cannot be perfectly compensated due to the different exit angles of the signals. The color at the large viewing angle has been partially corrected with the compensation films or the retardation films, but there are still different degrees of color signal errors. With twisted nematic (TN) and VA technology, there are the most serious color signal errors.

From the perspective of the red, green, and blue color stability at each viewing angle of a display, even if the VA display technology is added with a compensation film, it can still be found that there may be serious color shift when the viewing angle is greater than 45 degrees, that is, there may be the problem of greenish and whitening, especially when the image is in a skin color. As a result, many brand manufacturers are reluctant to apply the VA technology to their high-end products.

However, the VA technology still has the advantages of high contrast and strong color rendering at a center viewing angle. Therefore, how to improve the problem of the color shift of a VA liquid crystal display at a large viewing angle deserves research and development.

SUMMARY

The disclosure provides a vertical alignment liquid crystal display module, which can effectively improve the problem of color shift at a large viewing angle.

An embodiment of the disclosure provides a vertical alignment liquid crystal display module including a vertical alignment liquid crystal display panel and an image color switch film. The image color switch film is disposed on the vertical alignment liquid crystal display panel. The image color switch film has a following optical characteristic in various viewing angle directions having included angles of 60 degrees to 75 degrees with respect to a normal of the image color switch film: an average transmittance of a visible light transmission spectrum of the image color switch film at an end of short wavelength is less than an average transmittance of the visible light transmittance spectrum of the image color witch film at an end of long wavelength.

In the vertical alignment liquid crystal display module of the embodiments of the disclosure, at a large viewing angle, the configuration of the image color switch film allows the average transmittance of the visible light transmission spectrum at the end of short wavelength to be less than the average transmittance of the visible light transmission spectrum at the end of long wavelength, so when the viewing angle is large, the problem of greenish white images or blueish white images can be effectively improved, thereby improving the color accuracy of skin color images. That is, the vertical alignment liquid crystal display module of the embodiments of the disclosure can effectively improve the problem of color shift at a large viewing angle.

DESCRIPTION OF THE EMBODIMENTS

Figure 1A:
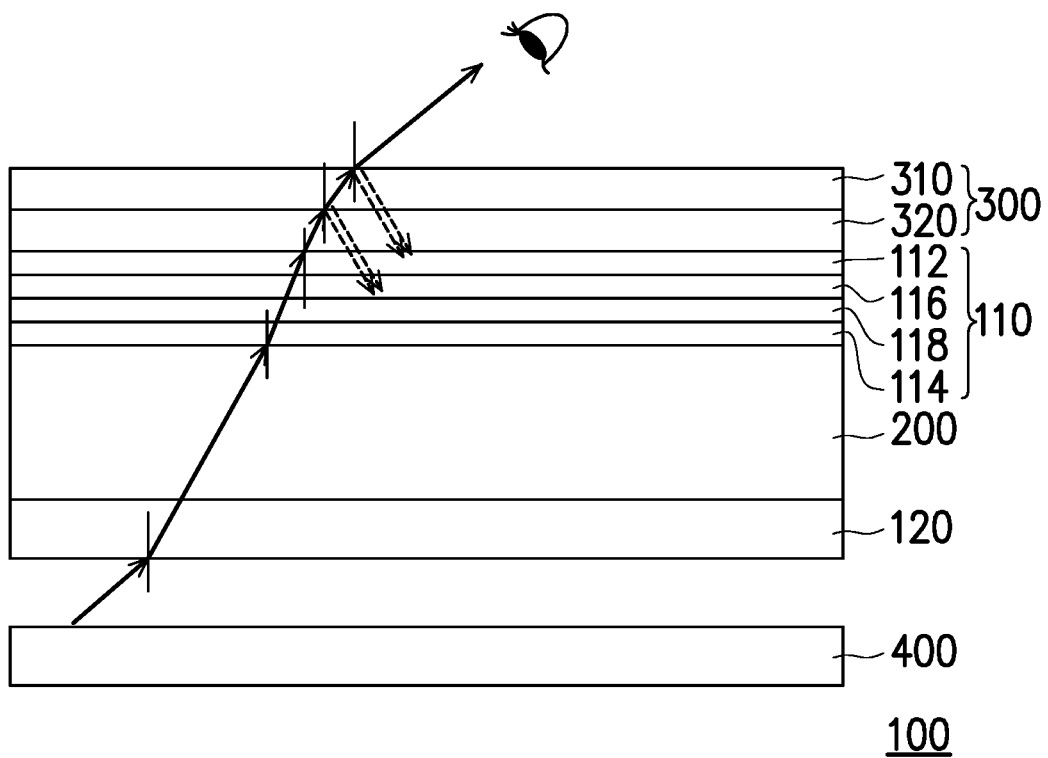
FIG. 1A is a schematic cross-sectional view of a vertical alignment liquid crystal display module according to an embodiment of the disclosure.
Figure 1B:
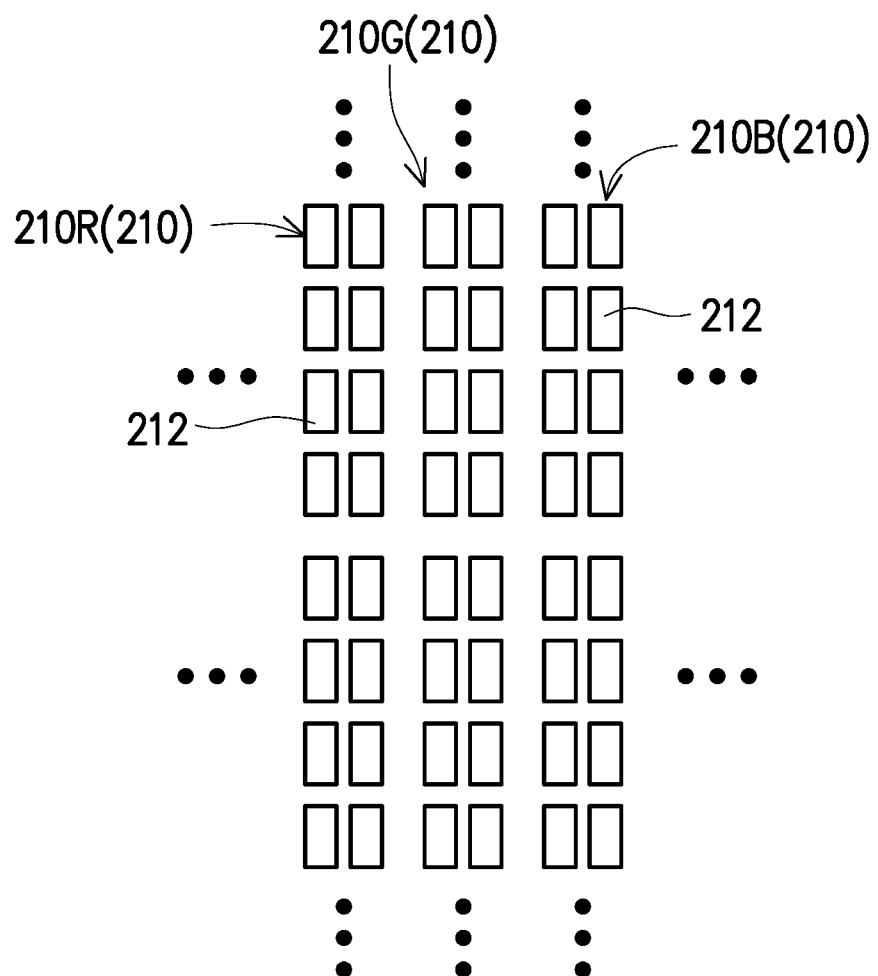
FIG. 1B is a schematic front view of the pixels of the vertical alignment liquid crystal display panel in FIG. 1A.
Figure 1C:
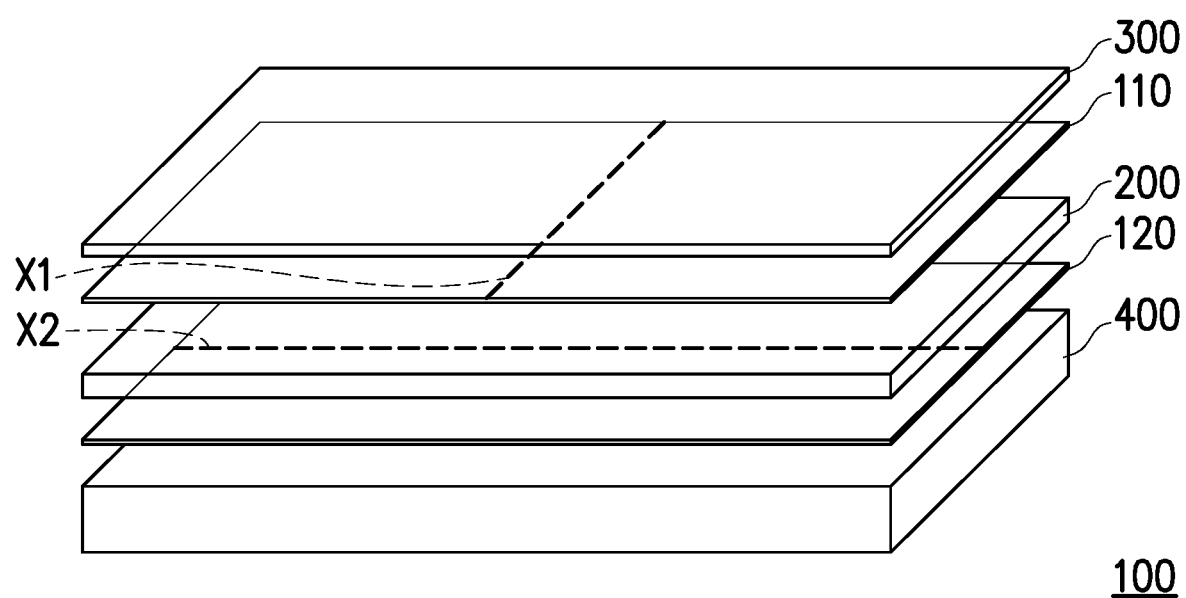
FIG. 1C is a three-dimensional layered view of the vertical alignment liquid crystal display module of FIG. 1A.

FIG. 1A is a schematic cross-sectional view of a vertical alignment liquid crystal display module according to an embodiment of the disclosure. FIG. 1B is a schematic front view of the pixels of the vertical alignment liquid crystal display panel in FIG. 1A. FIG. 1C is a three-dimensional layered view of the vertical alignment liquid crystal display module of FIG. 1A. Referring to FIG. 1A, FIG. 1B, and FIG. 1C, a vertical alignment liquid crystal display module 100 of the embodiment includes a vertical alignment liquid crystal display panel (VA-LCD panel) 200 and an image color switch film 300. In the embodiment, for example, the VA-LCD panel 200 is a multi-domain vertical alignment liquid crystal display panel (MVA-LCD panel). In FIG. 1B, an 8-domain vertical alignment liquid crystal display panel is taken as an example. Each sub-pixel 210 has eight alignment domains 212 of the liquid crystal molecules, and for example, the tilting directions of the liquid crystal molecules in the eight alignment domains 212 are four directions. For example, the four directions are approximately 45 degrees between the pixel alignment direction (i.e., the horizontal direction and the vertical direction). Moreover, adjacent one red sub-pixel 210R, one green sub-pixel 210G, and one blue sub-pixel 210B can form one pixel. In another embodiment, the multi-domain vertical alignment liquid crystal display panel may also be a 4-domain vertical alignment liquid crystal display panel, and each sub-pixel 210 has four alignment domains 212 of the liquid crystal molecules. For example, the tilting directions of the liquid crystal molecules in the four alignment domains 212 are 4 directions.

Figure 2:
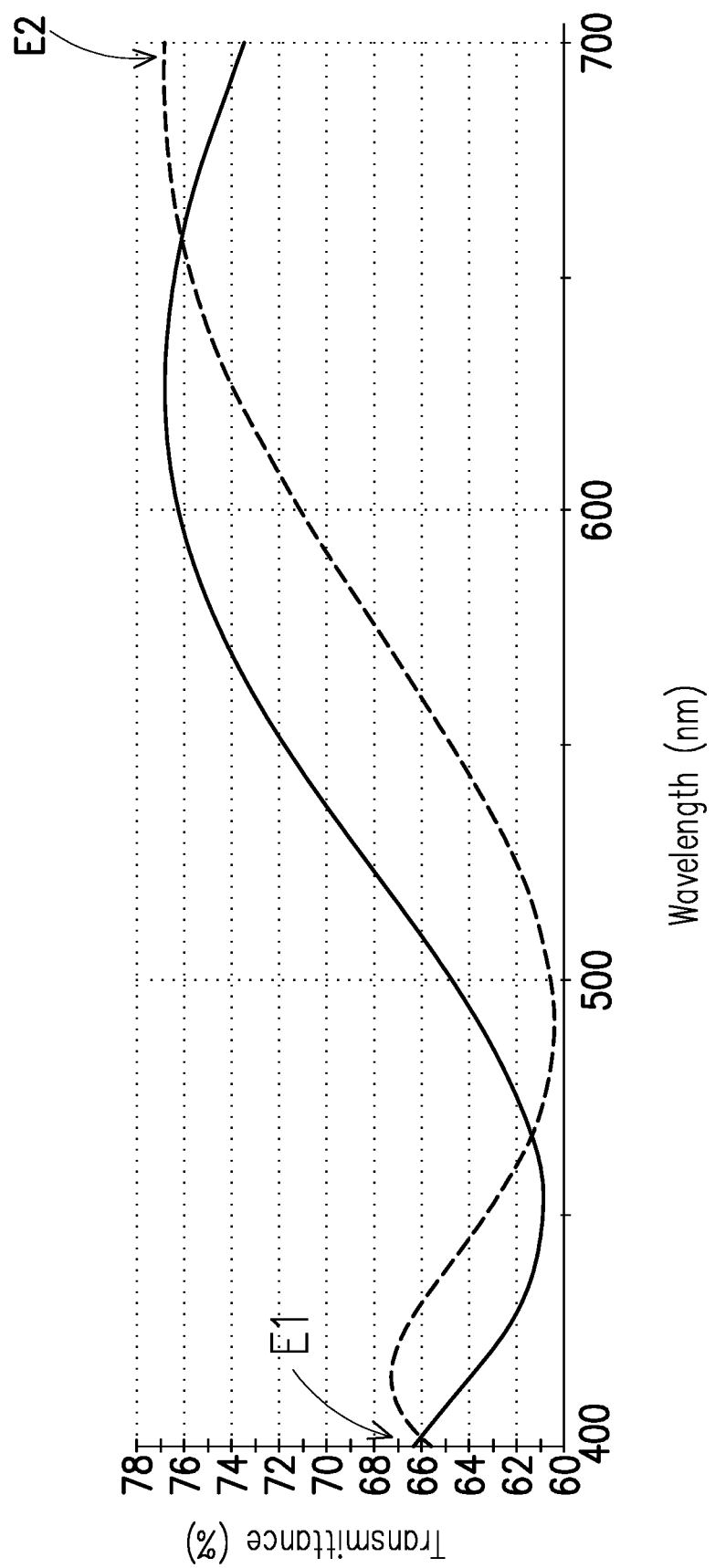
FIG. 2 illustrates the optical simulation transmittance spectrum of an image color switch film 300 when the viewing angle is 75 degrees according to two embodiments of the disclosure.

The image color switch film 300 is disposed on the VA-LCD panel 200. FIG. 2 illustrates the optical simulation transmittance spectrum of the image color switch film 300 when the viewing angle is 75 degrees according to two embodiments of the disclosure. Referring to FIG. 1A, FIG. 1B, and FIG. 2, the image color switch film 300 can adjust the original hue and frequency spectrum at various viewing angles and has the following optical characteristic for the VA-LCD panel 200 at a large viewing angle. Specifically, the image color switch film 300 has the following optical characteristic in various viewing angle directions having included angles of 60 degrees to 75 degrees with respect to the normal of the image color switch film 300; that is to say, the included angle is between the viewing angle direction and the normal of the image color switch film 300. The average transmittance of the visible light transmission spectrum of the image color switch film 300 at an end E1 of short wavelength is less than the average transmittance of the visible light transmission spectrum at an end E2 of long wavelength. In the embodiment, the average transmittance of the visible light transmittance spectrum of the image color switch film 300 at the end E1 of short wavelength refers to the average transmittance corresponding to the wavelengths ranging from 300 nm to 495 nm, and the average transmittance of the visible light transmittance spectrum of the image color switch film 300 at the end E2 of long wavelength refers to the average transmittance corresponding to the wavelengths ranging from 570 nm to 750 nm. In FIG. 2, the dashed transmittance spectrum curve and the solid transmittance spectrum curve belong to two different embodiments.

In the vertical alignment liquid crystal display module 100 of the embodiment, at a large viewing angle, the configuration of the image color switch film 300 allows the average transmittance of the visible light transmission spectrum at the end E1 of short wavelength to be less than the average transmittance of the visible light transmission spectrum at the end E2 of long wavelength, that is allows more red light and yellow light to pass through and to refrain some blue light and green light from passing through, so when the viewing angle is large, the problem of greenish white images or blueish white images can be effectively improved, thereby improving the color accuracy of skin color images. That is, the vertical alignment liquid crystal display module 100 of the embodiment can effectively improve the problem of color shift at a large viewing angle. Moreover, the vertical alignment liquid crystal display technology still has the advantages of high contrast and strong color rendering at a center viewing angle. The embodiment can improve the color shift at a large viewing angle and retain the high contrast characteristics of the vertical alignment liquid crystal display technology, which can surpass the IPS technology and become the display technology with the superior effect of color rendering.

Figure 3A:
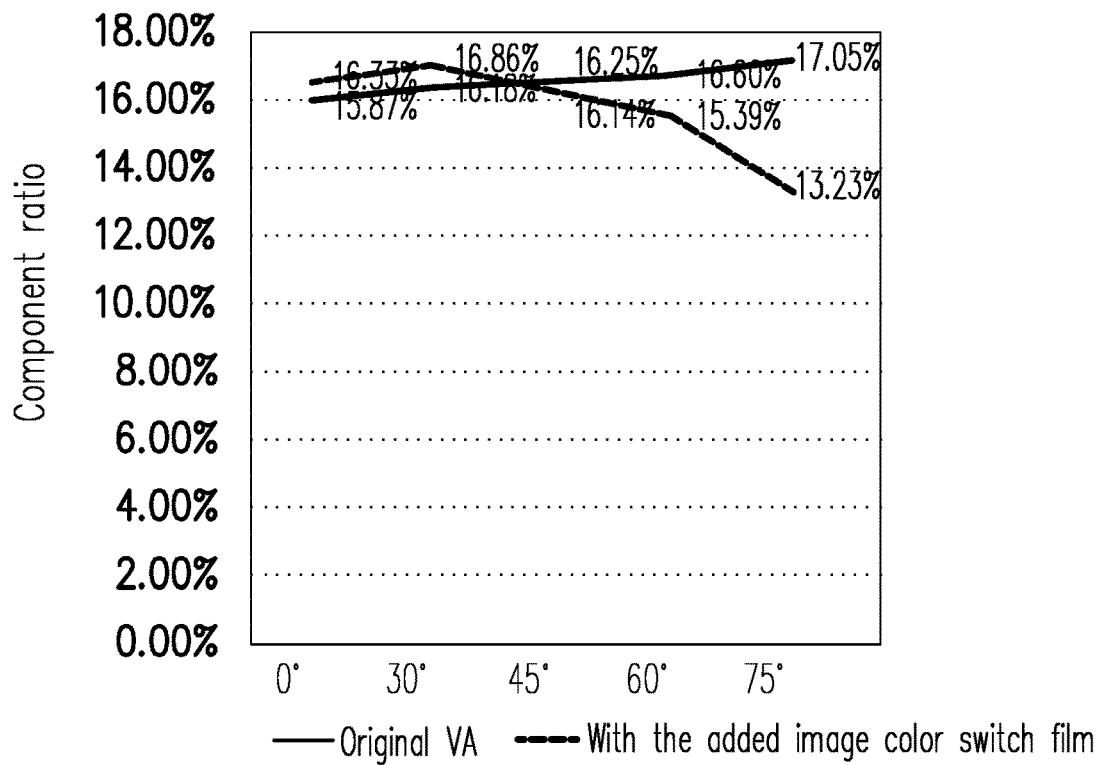
FIG. 3A, FIG. 3B, and FIG. 3C each illustrate the component ratios of blue, green, and red light emitted from the vertical alignment liquid crystal display panel and the component ratios of the blue, green, and red light further penetrating the image color switch film.
Figure 3B:
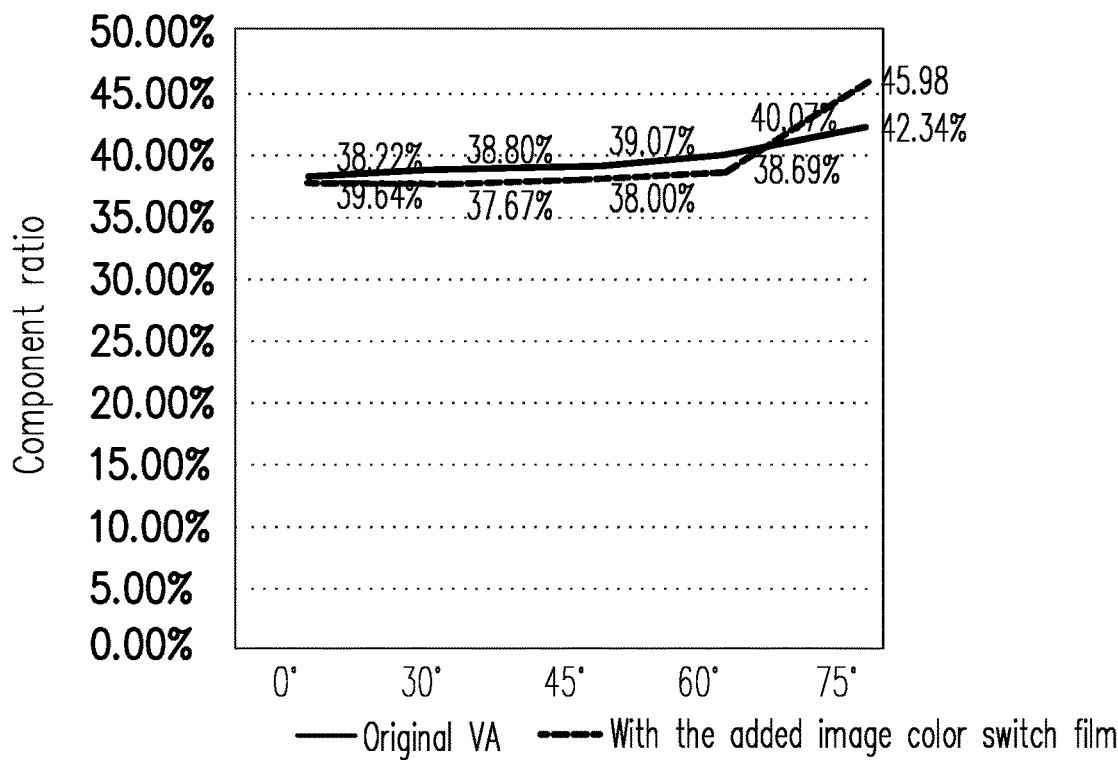
Figure 3C:
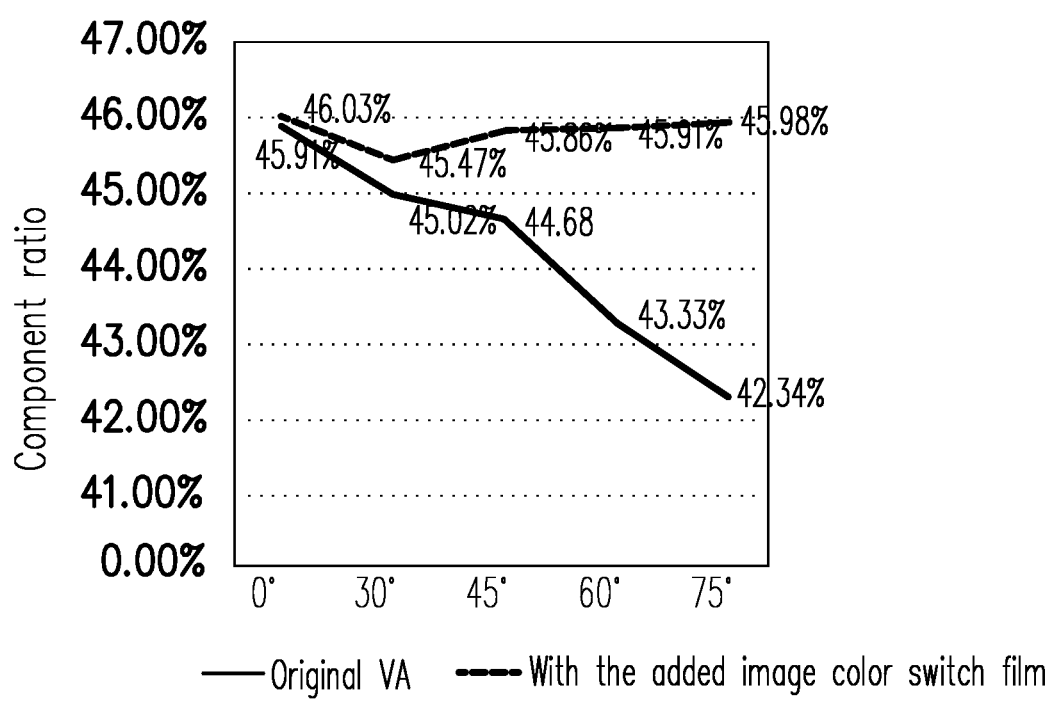

Specifically, please refer to FIG. 3A, FIG. 3B, and FIG. 3C. FIG. 3A, FIG. 3B, and FIG. 3C each illustrate the component ratios of blue, green, and red light emitted from the vertical alignment liquid crystal display panel and the component ratios of the blue, green, and red light further penetrating the image color switch film. The fold line corresponding to the "original VA" in FIG. 3A refers to the data of the light emitted from the VA-LCD panel 200, and the fold line corresponding to the "with the added image color switch film" refers to the data of the light emitted from the VA-LCD panel 200 and then further penetrating the image color switch film 300. According to FIG. 3A to FIG. 3C, the image color switch film 300 can greatly increase the component ratio of the red light in the image light, slightly increase the component ratio of the green light, and effectively suppress the component ratio of the blue light, so the problem of the greenish white or blueish white images when the viewing angle is large can be effectively improved, and then the color accuracy of the skin color images can be improved. In the embodiment, the component ratios of blue light, green light, and red light refer to the ratio of the areas of blue light, green light, and red light under the spectrum curve.

In one embodiment, the image color switch film 300 has the optical characteristic in various viewing angle directions having included angles of 45 degrees to 75 degrees with respect to the normal of the image color switch film 300. In one embodiment, the image color switch film 300 has the optical characteristic in various viewing angle directions having included angles of 30 degrees to 75 degrees with respect to the normal of the image color switch film 300. In one embodiment, the image color switch film 300 has the optical characteristic in various viewing angle directions having included angles of 60 degrees to 90 degrees with respect to the normal of the image color switch film 300.

In one embodiment, the optical characteristic further include that the transmittance of the visible light transmission spectrum increases first and then decreases from the end E1 of short wavelength to the end E2 of long wavelength. However, in other embodiments, the optical characteristic further include that the transmittance of the visible light transmission spectrum increases from the end E1 of short wavelength to the end E2 of long wavelength.

Referring to FIG. 1A again, the image color switch film 300 includes at least one layer of interference film, and by the principle of film interference, light (i.e., red light, green light, and blue light) with different wavelengths is reflected and passes through the image color switch film 300. In the embodiment, the at least one interference film includes a first light-transmitting film 310 and a second light-transmitting film 320. The second light-transmitting film 320 is stacked with the first light-transmitting film 310, and the refractive index of the first light-transmitting film 310 is less than the refractive index of the second light-transmitting film 320. In one embodiment, the refractive index of the first light-transmitting film 310 is 1.6 or less, and the refractive index of the second light-transmitting film 320 is 1.8 to 2.4. In the embodiment, the vertical alignment liquid crystal display module 100 further includes a polarizing plate 110 disposed between the image color switch film 300 and the VA-LCD panel 200. Moreover, in the embodiment, the second light-transmitting film 320 is disposed between the first light-transmitting film 310 and the polarizing plate 110, and the refractive index of the first light-transmitting film 310 is 1.66 or less, for example. Moreover, the vertical alignment liquid crystal display module 100 may further include a polarizing plate 120, and the VA-LCD panel 200 is disposed between the polarizing plate 110 and the polarizing plate 120.

In the embodiment, for example, the material of the first light-transmitting film 310 is silicon dioxide (SiO2), magnesium fluoride (MgF2), or a coating material with a low refractive index. The material of the second light-transmitting film 320 may be a transparent ceramic material with a high refractive index, such as titanium dioxide, niobium pentoxide (Nb2O5), or indium tin oxide (ITO).

In the embodiment, the polarizing plate 110 includes a first transparent substrate 112, a second transparent substrate 114, a polarizing layer 116, and a phase difference compensation film 118. The first transparent substrate 112 is disposed between the image color switch film 300 and the VA-LCD panel 200, and the second transparent substrate 114 is disposed between the first transparent substrate 112 and the VA-LCD panel 200. The polarizing layer 116 is disposed between the first transparent substrate 112 and the second transparent substrate 114, and the phase difference compensation film 118 is disposed between the first transparent substrate 112 and the second transparent substrate 114. In the embodiment, the phase difference compensation film 118 is disposed between the polarizing layer 116 and the second transparent substrate 114. In another embodiment, the phase difference compensation film 118 and the second transparent substrate 114 may be integrated, that is, the second transparent substrate 114 is a phase difference compensation film without an additional phase difference compensation film 118 disposed on the polarizing plate 110. Specifically, the second transparent substrate 114 can turn into a phase difference compensation film through a stretching process. Alternatively, a liquid crystal layer (i.e., a phase difference compensation film 118) may be coated on the second transparent substrate 114. Alternatively, a liquid crystal layer may be coated on the stretched second transparent substrate 114, that is, the second transparent substrate 114 and the phase difference compensation film 118 both have the function of phase difference compensation. The phase difference compensation film 118 and the stretched second transparent substrate 114 may have birefringence or multi-refraction, that is, have different refractive indexes in different directions. Accordingly, the phase difference of the image light at the large viewing angle emitted from the VA-LCD panel 200 can be compensated, so that the image quality for the large viewing angle can be improved. The phase difference compensation film 118 can adopt various techniques well known to those with ordinary knowledge in the art, which is not repeated herein.

Moreover, the polarizing plate 120 may be a general polarizing plate, which may include two transparent substrates and a polarizing layer disposed between the two transparent substrates. A backlight module 400 commonly used in liquid crystal displays may be disposed under the polarizing plate 120, which is well known to those with ordinary knowledge in the art and is not repeated herein. Moreover, the image color switch film 300 is not limited to only include the first light-transmitting film 310 and the second light-transmitting film 320. In another embodiment, the image color switch film 300 may include three or more light-transmitting films with alternately stacked high and low refractive indexes. The disclosure is not limited thereto. Alternatively, in another embodiment, the image color switch film 300 may be a single light-transmitting film with a refractive index ranging from 1.35 to 2.5, and in one embodiment, it ranges from 1.5 to 2.5, for example.

In the embodiment, for example, the material of the first transparent substrate 112 and the second transparent substrate 114 is polyester (PET), tri-acetyl cellulose (TAC), polymethyl methacrylate (PMMA), or other plastic substrates, and the material of the polarizing layer 116 is polyvinyl alcohol (PVA), for example, but the disclosure is not limited thereto.

Figure 1D:
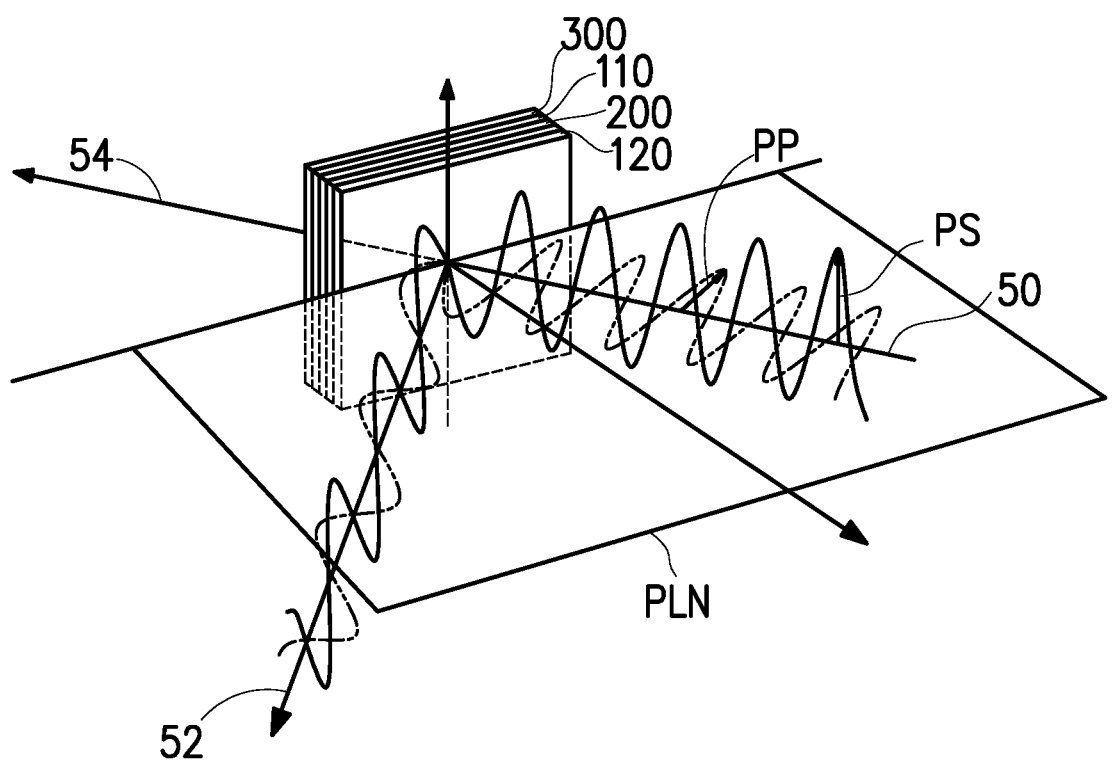
FIG. 1D is a three-dimensional schematic diagram of parallel polarized light and vertical polarized light of the vertical alignment liquid crystal display module of FIG. 1C.

FIG. 1D is a three-dimensional schematic diagram of parallel polarized light and vertical polarized light of the vertical alignment liquid crystal display module of FIG. 1C. Referring to FIG. 1C and FIG. 1D, in the embodiment, a transmission axis X1 of the polarizing plate 110 is parallel to the short side direction of the VA-LCD panel 200, a transmission axis X2 of the polarizing plate 120 is parallel to the long side direction of the VA-LCD panel 200, for example, and the transmission axis X1 and the transmission axis X2 are perpendicular to each other (as shown in FIG. 1C). If the transmission axis X1 of the polarizing plate 110 is perpendicular to the long side direction of the VA-LCD panel 200 (the long side direction is parallel to the desktop direction, for example), at the large viewing angle in the horizontal direction of the vertical alignment liquid crystal display module 100, vertically polarized light can be observed. If viewed from a plane PLN formed by incident light 50 and reflected light 52 from the backlight module 400, only the polarized light (i.e., the vertically polarized light) corresponding to the transmission axis X1 of polarizing plate 110 and with a polarization direction PS perpendicular to the plane PLN can pass through. Therefore, in the interference design, the parameters (e.g., film thickness, refractive index, and the like) of the image color switch film 300 can be designed according to vertical polarized light, that is, tailored specifically for vertical polarized light to adjust its spectrum in the manner, so that it has the optical characteristic. Part of the incident light 50 passes through the polarizing plate 120, the VA-LCD panel 200, the polarizing plate 110, and the image color switch film 300 and becomes transmitted light 54, and part of the incident light 50 is reflected into the reflected light 52 by the image color switch film 300. However, in another embodiment, the image color switch film 300 is located on the polarizing plate 120. If its transmission axis X2 is parallel to the short side direction of the VA-LCD panel 200 (this short side direction is perpendicular to the desktop), after the incident light 50 is incident to the VA-LCD panel 200 from the backlight module 400, the reflected light 52 is generated after the incident light 50 hits the image color switch film 300. The incident light 50 and the reflected light 52 form the plane PLN, most of the polarized light with the polarization direction PS perpendicular to the plane PLN can pass through the transmission axis X2, and the image color switch film 300 is also designed with the vertical polarization direction PS. Conversely, if the direction of the transmission axis X2 is parallel to the long side direction of the VA-LCD panel 200 and the image color switch film 300 is located on the polarizing plate 120, similarly, in the image adjustment of the horizontal large viewing angle, the image color switch film 300 is designed with the parallel polarization direction PP (where the parallel polarization direction PP is parallel to the plane PLN, and the polarization direction PP is parallel to the plane PLN of the polarized light called parallel polarized light). Generally speaking, when the parameters of the image color switch film 300 are designed based on vertical polarized light, it facilitates the design, and a small quantity of layers can be used to achieve the good optical characteristic described.

Figure 4:
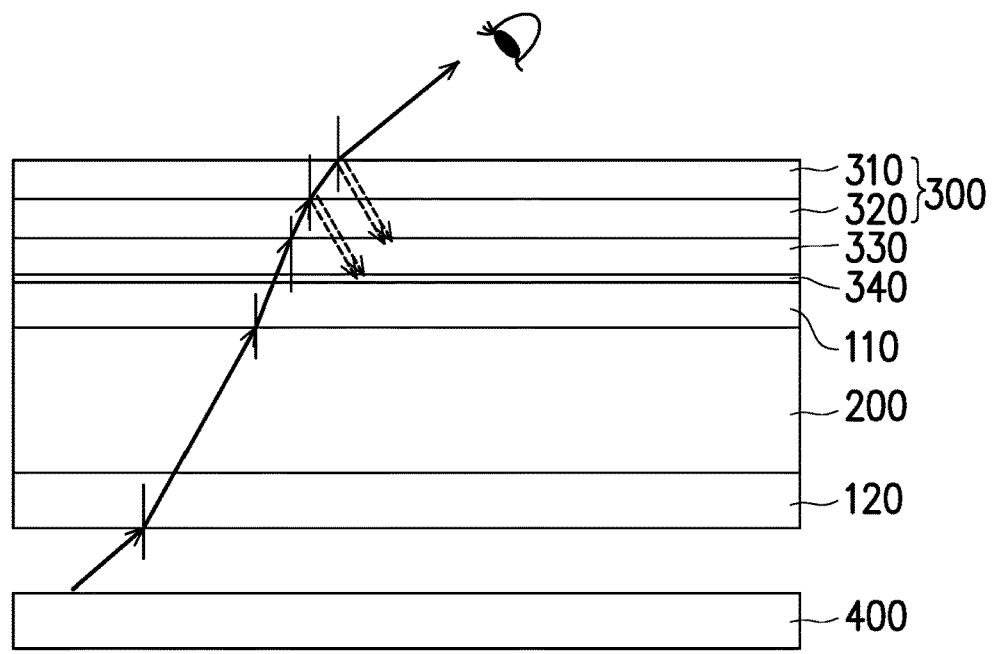
FIG. 4 is a schematic cross-sectional view of a vertical alignment liquid crystal display module according to another embodiment of the disclosure.

FIG. 4 is a schematic cross-sectional view of a vertical alignment liquid crystal display module according to another embodiment of the disclosure. A vertical alignment liquid crystal display module 100a of the embodiment is similar to the vertical alignment liquid crystal display module 100 of FIG. 1A. The difference between the two is that in the vertical alignment liquid crystal display module 100 of FIG. 1A, the first light-transmitting film 310 and the second light-transmitting film 320 are formed on the polarizing plate 110. However, in the vertical alignment liquid crystal display module 100a of the embodiment, the first light-transmitting film 310 and the second light-transmitting film 320 of the image color switch film 300 are first formed on the light-transmitting substrate 330, and then the light-transmitting substrate 330 is further attached to the polarizing plate 110 through an adhesive 340.

Figure 5:
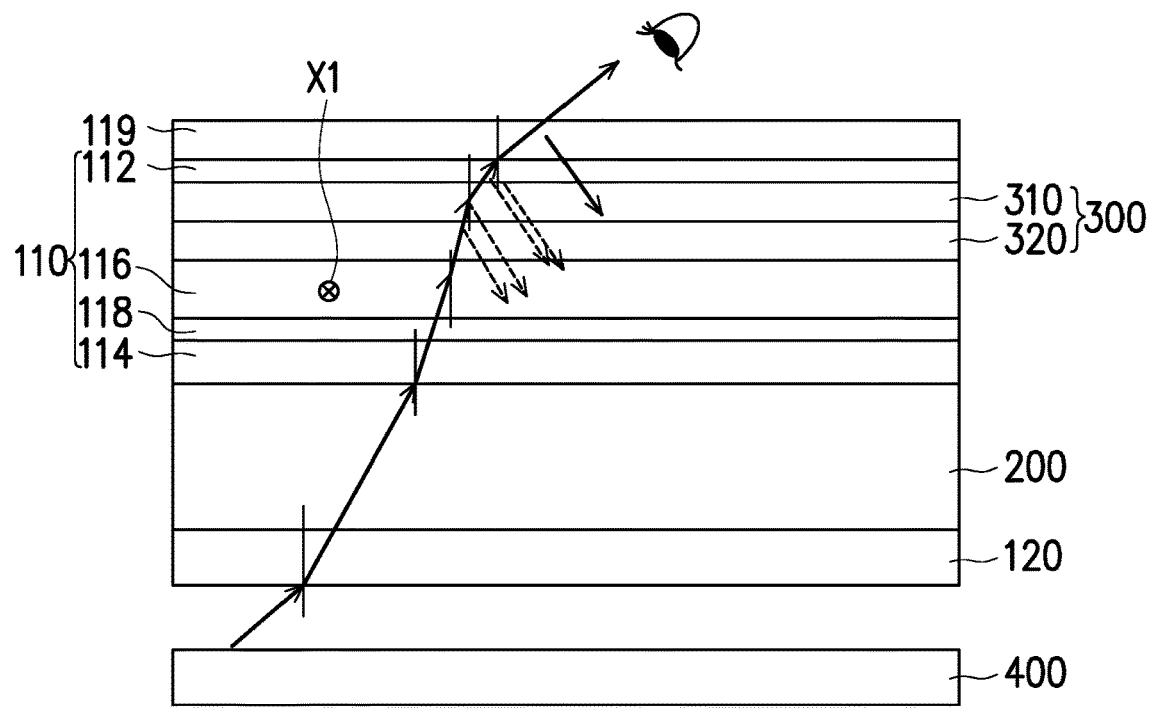
FIG. 5 is a schematic cross-sectional view of a vertical alignment liquid crystal display module according to yet another embodiment of the disclosure.

FIG. 5 is a schematic cross-sectional view of a vertical alignment liquid crystal display module according to yet another embodiment of the disclosure. Referring to FIG. 5, the vertical alignment liquid crystal display module 100b of the embodiment is similar to the vertical alignment liquid crystal display module 100 of FIG. 1A, and the differences between the two are as follows. In the vertical alignment liquid crystal display module 100 of FIG. 1A, the image color switch film 300 is disposed outside the polarizing plate 110. However, in the vertical alignment liquid crystal display module 100b of the embodiment, the image color switch film 300 may be integrated into the inside of the polarizing plate 110. Specifically, in the embodiment, the image color switch film 300 is disposed between the first transparent substrate 112 and the VA-LCD panel 200, the second transparent substrate 114 is disposed between the image color switch film 300 and the VA-LCD panel 200, the polarizing layer 116 is disposed between the image color switch film 300 and the second transparent substrate 114, and the phase difference compensation film 118 is disposed between the polarizing layer 116 and the second transparent substrate 114.

In the embodiment, the order of the first light-transmitting film 310 and the second light-transmitting film 320 of the image color switch film 300 can be reversed, and the first light-transmitting film 310 may be under the second light-transmitting film 320, or the second light-transmitting film 320 may be under the first light-transmitting film 310.

The refractive index of the first light-transmitting film 310 is 1.6 or less, and the refractive index of the second light-transmitting film 320 is 1.8 to 2.5. In the embodiment, the refractive index of the first transparent substrate 112 is 1.7 or less.

In the embodiment, the vertical alignment liquid crystal display module 100b further includes a surface treatment layer 119, and the first transparent substrate 112 is disposed between the surface treatment layer 119 and the image color switch film 300. For example, the refractive index of the surface treatment layer 119 is less than 1.5. For example, the surface treatment layer 119 is an anti-glare layer, an anti-reflection layer, or a hard-coating layer.

Moreover, the same as those in the embodiment of FIG. 1A, the phase difference compensation film 118 and the second transparent substrate 114 may be integrated, that is, the second transparent substrate 114 is a phase difference compensation film, without an additional phase difference compensation film 118 disposed on the polarizing plate 110.

In the embodiment, for example, the transmission axis X1 of the polarizing layer 116 is parallel to the short side direction of the VA-LCD panel 200 (i.e., the direction into the paper surface of FIG. 5), so when the eyes of the user look at the vertical alignment liquid crystal display module 100b at a large viewing angle in the horizontal direction, vertically polarized light may be seen. If the incident light 50 and the reflected light 52 at a large viewing angle are regarded as the plane PLN (referring to FIG. 1D), the transmission axis X1 of the polarizing plate 110 of the vertical alignment liquid crystal display module 100b is controlled to be parallel to the short side direction of the vertical alignment liquid crystal display module 100b, and in the incident light 50, only most of the polarized light with the polarization direction PS parallel to the short side direction can pass through the VA-LCD panel 200, so the image color switch film 300 can be designed according to the direction of the transmission axis X1 of the polarizing plate 110 to achieve the optical characteristic. However, in other embodiments, the transmission axis X1 of the polarizing layer 116 may also be parallel to the long side direction of the VA-LCD panel 200.

Figure 6A:
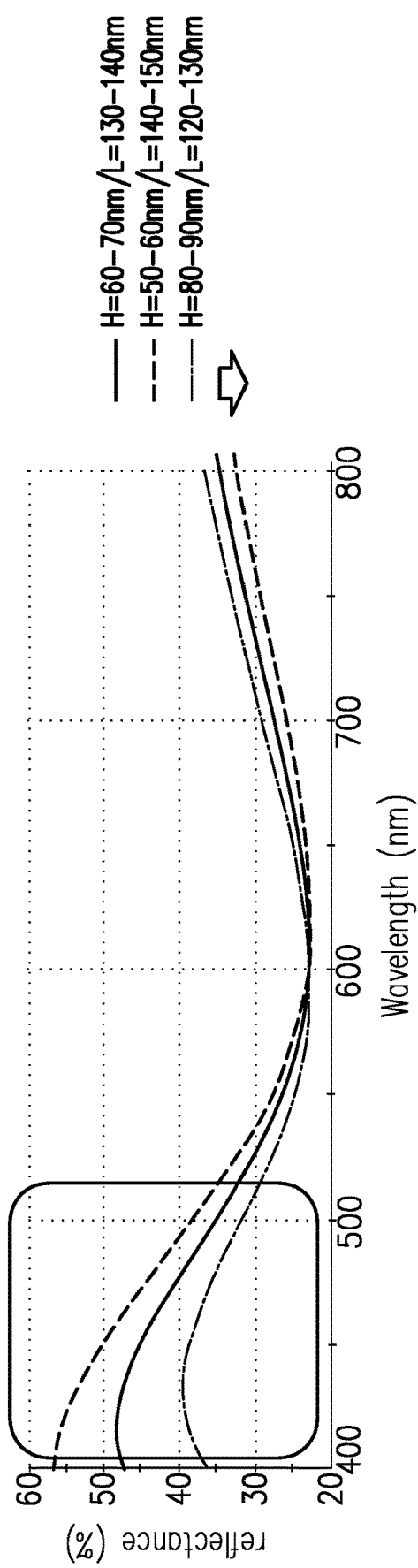
FIG. 6A and FIG. 6B illustrate the reflectance spectra and transmittance spectra of the image color switch film when the viewing angle is 60 degrees according to three embodiments of the disclosure.
Figure 6B:
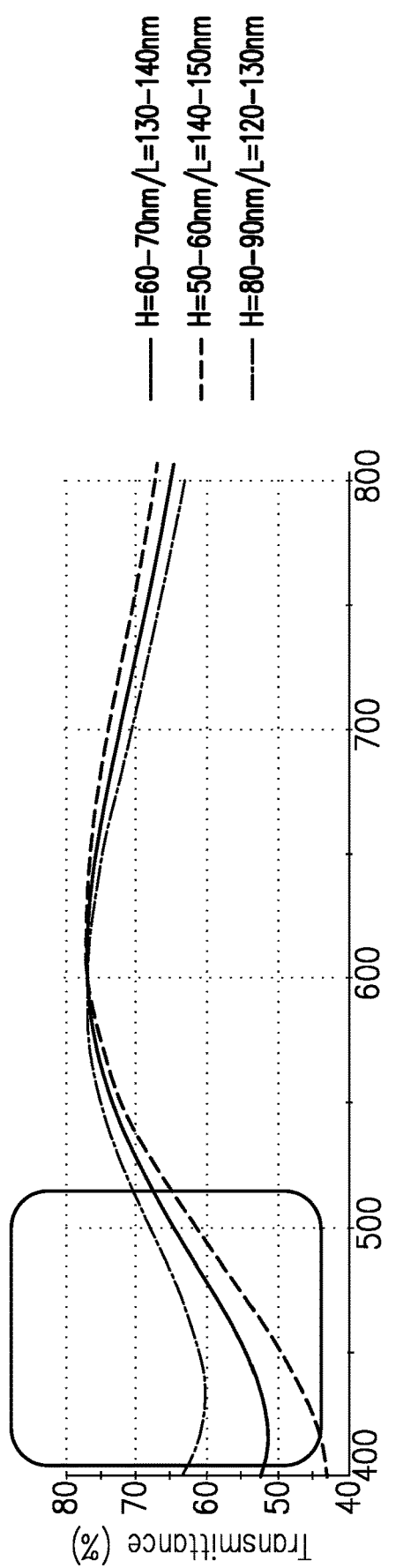

FIG. 6A and FIG. 6B illustrate the reflectance spectra and transmittance spectra of the image color switch film when the viewing angle is 60 degrees according to three embodiments of the disclosure. In FIG. 6A and FIG. 6B, the curve corresponding to "H=60-70 nm/L=130-140 nm" means that the thickness of the second light-transmitting film 320 of the image color switch film ranges from 60 nm to 70 nm, the thickness of the first light-transmitting film 310 is the spectrum data of 130 nm to 140 nm, and the meaning of the other curves can be analogically reasoned. Moreover, for example, in FIG. 6A and FIG. 6B, the refractive index of the second light-transmitting film 320 is 1.8 to 2.4, and the refractive index of the first light-transmitting film 310 is 1.6 to 1.3, for example. The design goal of the image color switch film is to look at the transmittance spectrum of general white light. In the design of the image color switch film, the average transmittance of light with a wavelength of 600 to 800 nm may be greater than the average transmittance of light with a wavelength of 400 to 600 nm to form a tendency of low transmittance for short wavelengths and high transmittance for long wavelengths.

Figure 7:
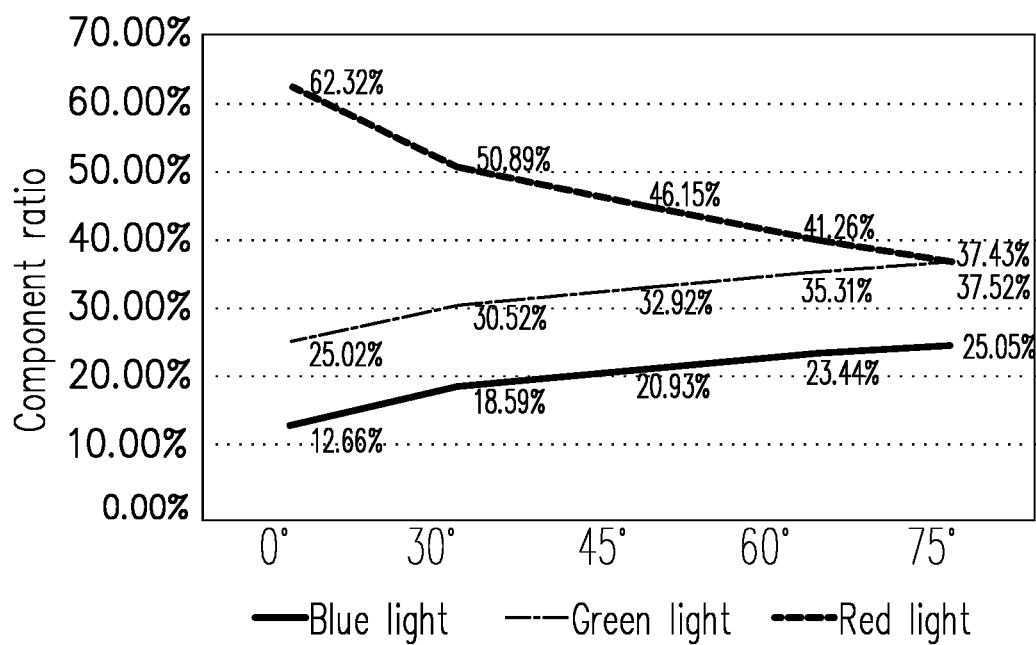
FIG. 7 is a broken line diagram illustrating the component ratios of the red light, the green light, and the blue light in a variety of different viewing angles when the image color switch film is not added to the 4-domain vertical alignment liquid crystal display panel.
Figure 8:
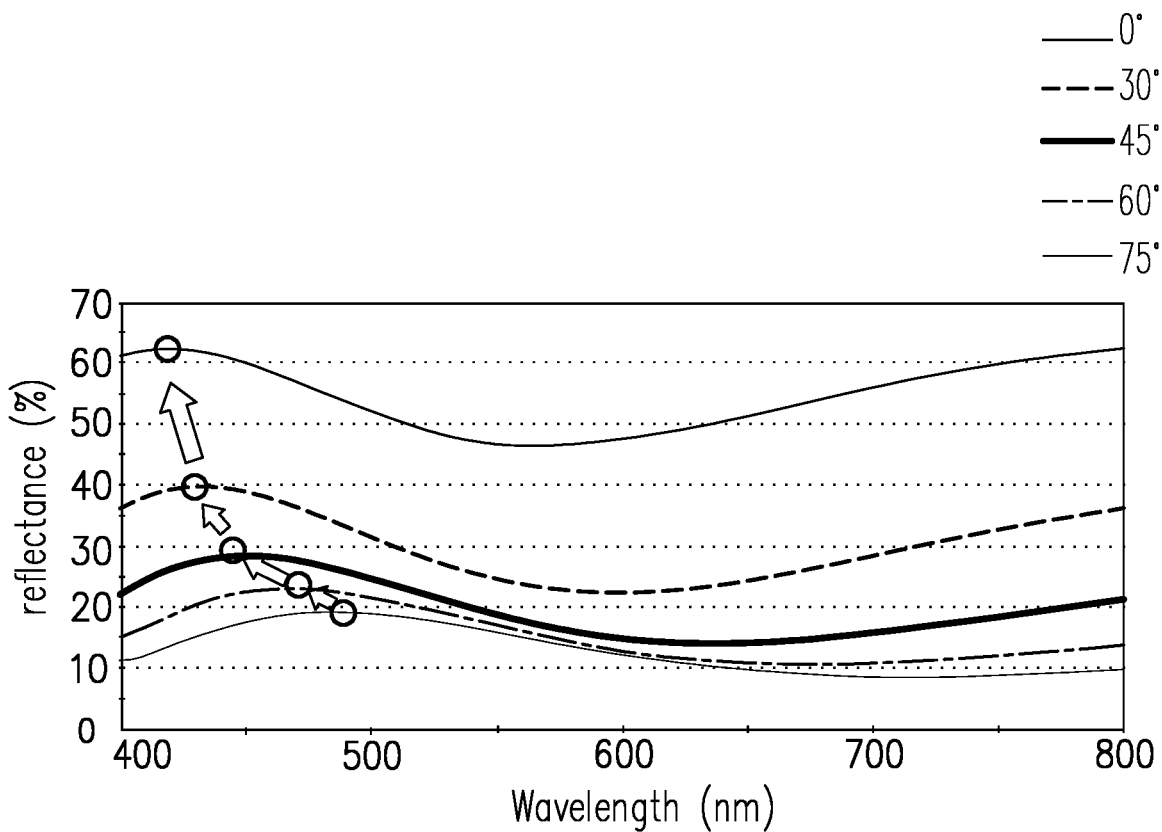
FIG. 8 illustrates the reflectance spectra of the image color switch film and the light-transmitting substrate in the vertical alignment liquid crystal display module of FIG. 4 at various viewing angles.

FIG. 7 is a broken line diagram illustrating the component ratios of the red light, the green light, and the blue light in a variety of different viewing angles when the image color switch film is not added to the 4-domain vertical alignment liquid crystal display panel. In the embodiment, the component ratios of the blue light, the green light, and the red light refer to the ratios of the areas of the blue light, the green light, and the red light under the spectrum curve. FIG. 8 illustrates the reflectance spectra of the image color switch film 300 and the light-transmitting substrate 330 in the vertical alignment liquid crystal display module of FIG. 4 at various viewing angles. Referring to FIG. 4, FIG. 7, and FIG. 8, the image color switch film of the embodiment of the disclosure utilizes constructive interference reflection spectrum to design "the relative peak of the reflectance moves towards the upper left of FIG. 8 as the viewing angle increases" as the main design focus. When observing the spectrum distribution of each viewing angle of the vertical alignment liquid crystal display panel, it is found that the ratio of red light in the 4-domain vertical alignment liquid crystal display panel rapidly decreases along with the increase of viewing angle, while the ratio of the green light and the ratio of the blue light increase, and similar problems happen to the 8-domain vertical alignment liquid crystal display panel.

In the image color switch film, the reflection effect of the constructive interference of the thin film (single layer or multi-layer, each film thickness ranging from about 10 to 750 nm) is used, the blue light or part of the green light is reflected at a large viewing angle and enters the inside of the liquid crystal display panel from the polarizing plate, so that the spectrum observed by the observer and the relative energy of the red light is higher than that of the original liquid crystal display panel with no image color switch film. Therefore, the ratio of the red light at the large viewing angle is adjusted to be close to the center viewing angle to confirm that the image quality of the large viewing angle is similar to the image quality of the center viewing angle.

In terms of design, for a preferred embodiment of the reflectance spectrum design, it is preferred that the relative peak area can move to the upper left (the blue light direction) as the viewing angle increases. When the peak of the blue band of the reflectance spectrum increases with the viewing angle, the reflectance spectrum can be designed to move to the upper left. The purpose is when the observer moves from the center viewing angle to the large viewing angle, since the blue light and green light reduction ratio is gradually increased, the image color switch film is allowed to be designed to also gradually improve the "ability to reduce the blue light" (or ability to increase the energy ratio of the red light and the yellow light), to be used on a vertical alignment liquid crystal display panel, and to reversely adjust the energy ratio of the red light, the green light, and the blue light at the large viewing angle.

To ensure that the interference effect can occur, if a single-layer film is taken as an example, the thickness of the formed film is d, the refractive index is n, and the viewing angle is θ, then $n \cdot d \cdot \cos\theta = \frac{1}{4} \cdot m \cdot \lambda$, where m is an odd number, λ is the wavelength of light, the specific definition of θ is the angle between the line from the position of the eyes of the user to the center of the light-emitting surface of the vertical alignment liquid crystal display module and the normal of the vertical alignment liquid crystal display module.

In the embodiment of FIG. 8, the refractive index of the second light-transmitting film 320 is 2 to 2.4, for example, and the refractive index of the first light-transmitting film 310 is 1.3 to 1.5, for example.

Figure 9:
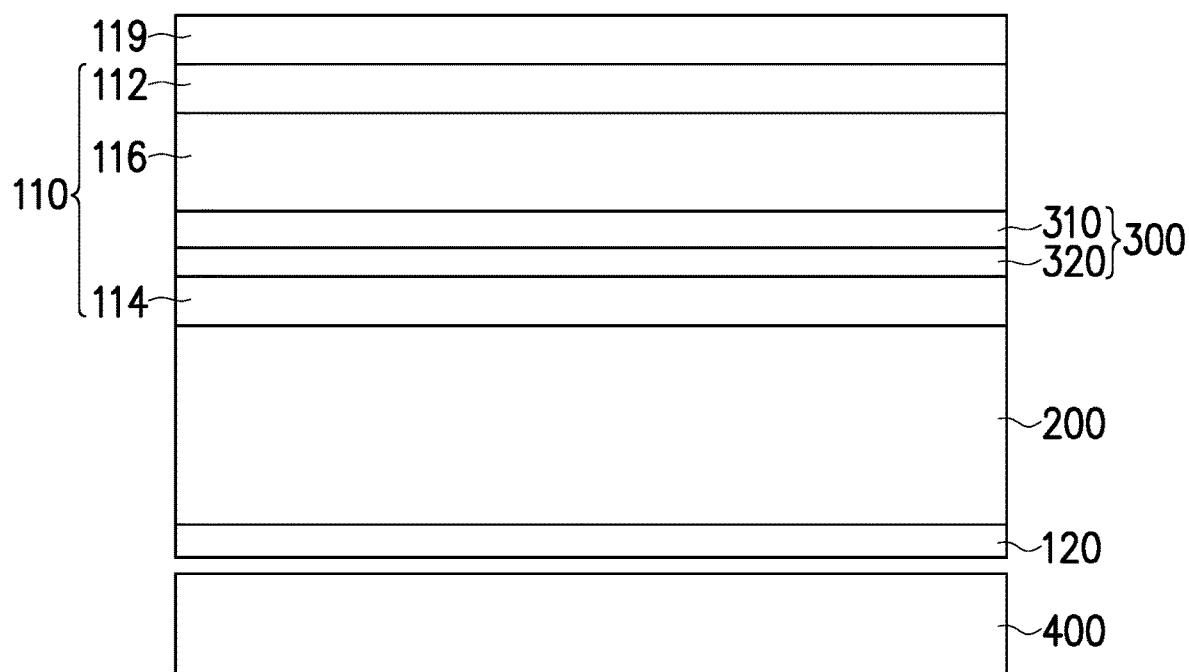
FIG. 9 is a schematic cross-sectional view of a vertical alignment liquid crystal display module according to still another embodiment of the disclosure.

FIG. 9 is a schematic cross-sectional view of a vertical alignment liquid crystal display module according to still another embodiment of the disclosure. Referring to FIG. 9, a vertical alignment liquid crystal display module 100c of the embodiment is similar to the vertical alignment liquid crystal display module 100b of FIG. 5, and the difference between the two is as follows. In the embodiment, the image color switch film 300 is disposed between the polarizing layer 116 and the second transparent substrate 114.

Figure 10:
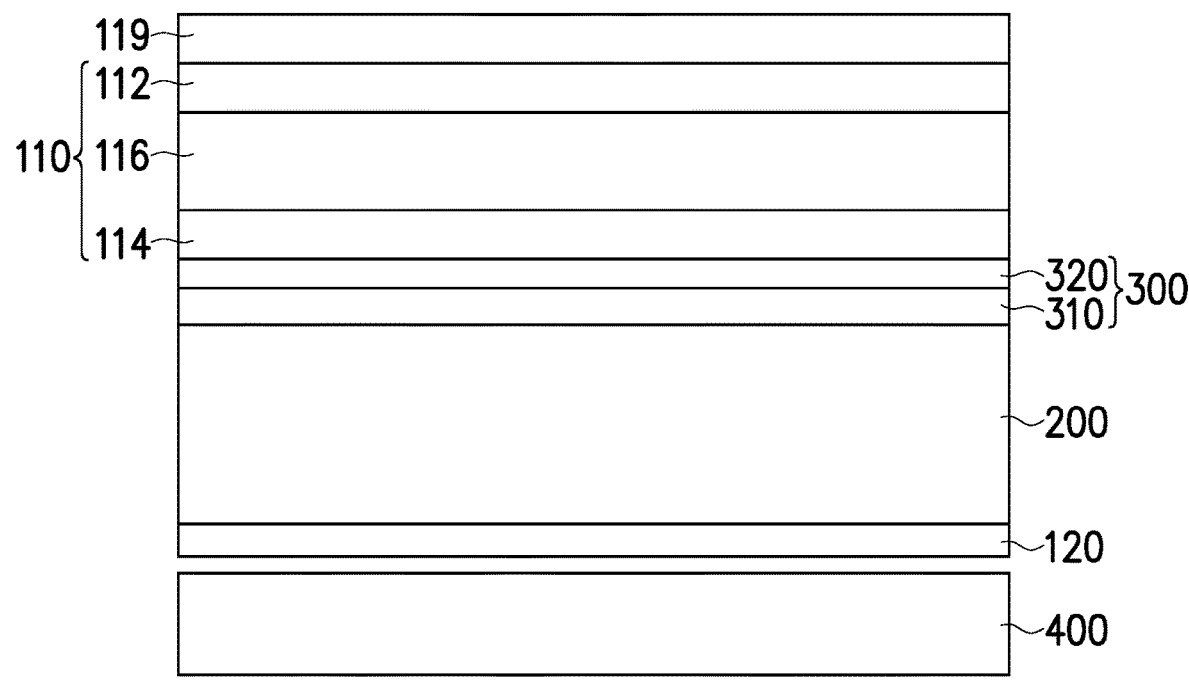
FIG. 10 is a schematic cross-sectional view of a vertical alignment liquid crystal display module according to another embodiment of the disclosure.

FIG. 10 is a schematic cross-sectional view of a vertical alignment liquid crystal display module according to another embodiment of the disclosure. Referring to FIG. 10, a vertical alignment liquid crystal display module 100d of the embodiment is similar to the vertical alignment liquid crystal display module 100b of FIG. 5, and the differences between the two are as follows. In the embodiment, the image color switch film 300 is disposed between the second transparent substrate 114 and the VA-LCD panel 200, that is, between the polarizing plate 110 and the VA-LCD panel 200, and the image color switch film 300 is disposed above the VA-LCD panel 200.

Figure 11A:
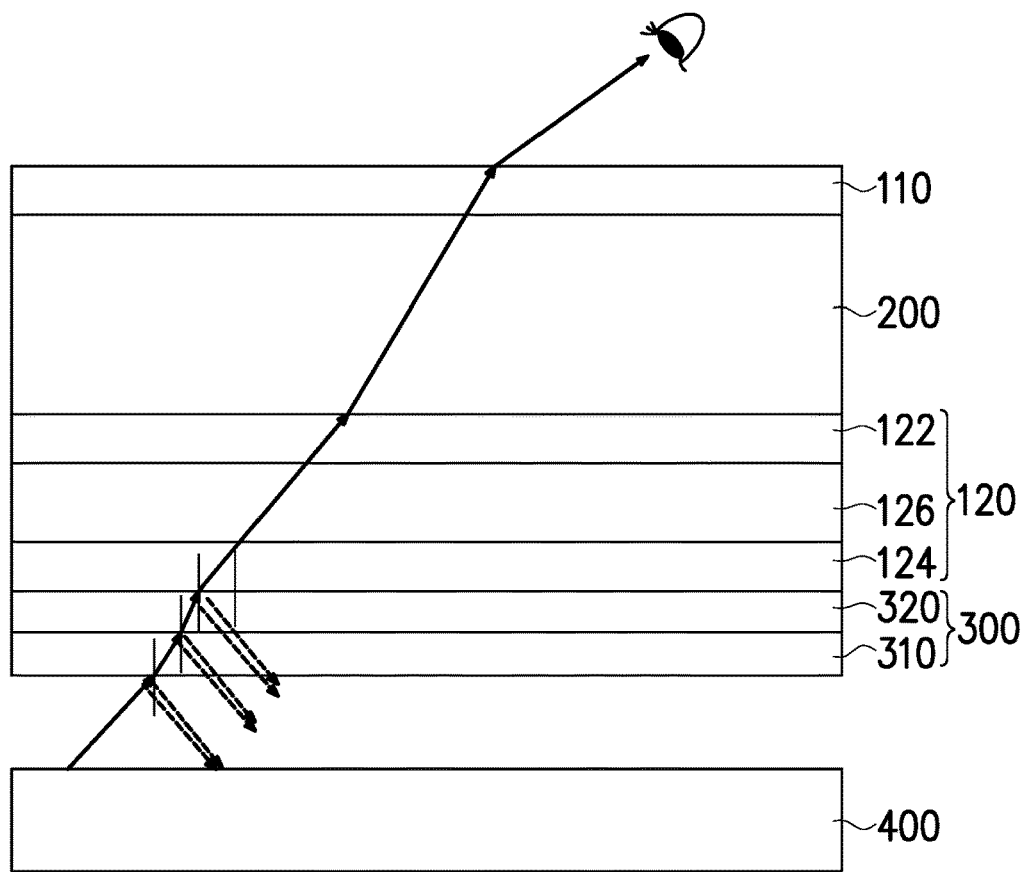
FIG. 11A is a schematic cross-sectional view of a vertical alignment liquid crystal display module according to yet another embodiment of the disclosure.
Figure 11B:
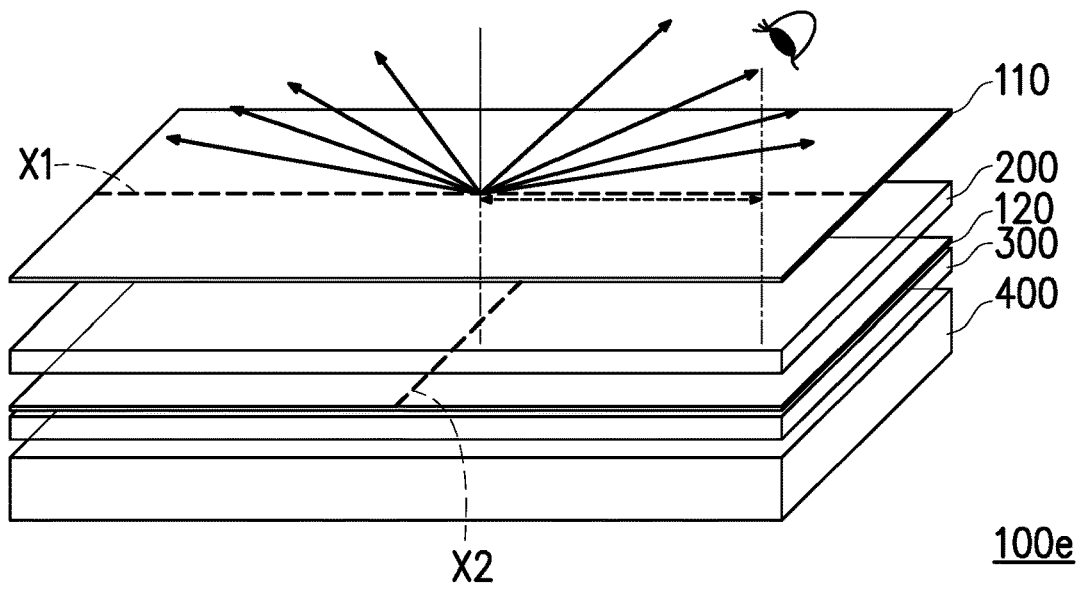
FIG. 11B is a three-dimensional layered view of the vertical alignment liquid crystal display module of FIG. 11A.

FIG. 11A is a schematic cross-sectional view of a vertical alignment liquid crystal display module according to yet another embodiment of the disclosure, and FIG. 11B is a three-dimensional layered view of the vertical alignment liquid crystal display module of FIG. 11A. Referring to FIG. 11A and FIG. 11B, a vertical alignment liquid crystal display module 100e of the embodiment is similar to the vertical alignment liquid crystal display module 100 of FIG. 1A and FIG. 1C, and the differences between the two are as follows. In the vertical alignment liquid crystal display module 100e of the embodiment, the image color switch film 300 is disposed under the VA-LCD panel 200, and the polarizing plate 120 is disposed between the image color switch film 300 and the VA-LCD panel 200, but in other embodiments, the image color switch film 300 may also be disposed between the polarizing plate 120 and the VA-LCD panel 200.

In the embodiment, the polarizing plate 120 includes a third transparent substrate 122, a fourth transparent substrate 124, and a polarizing layer 126. The third transparent substrate 122 is disposed under the VA-LCD panel 200, and the third transparent substrate 122 is disposed between the VA-LCD panel 200 and the fourth transparent substrate 124. The polarizing layer 126 is disposed between the third transparent substrate 122 and the fourth transparent substrate 124. The optional materials for the third transparent substrate 122 and the fourth transparent substrate 124 can be selected from the materials for the first transparent substrate 112 and the second transparent substrate 114, and the optional materials for the polarizing layer 126 can be selected from the materials for the polarizing layer 116.

In the embodiment, the transmission axis X2 of the polarizing plate 120 (i.e., the transmission axis of the polarizing layer 126) is parallel to the short side direction of the VA-LCD panel 200, so for light at a large viewing angle in the horizontal direction, the polarizing plate 120 allows the vertical polarized light from the image color switch film 300 to pass through and blocks the parallel polarized light from the image color switch film 300. Therefore, the parameters of the image color switch film 300 can be set according to the vertically polarized light to achieve the optical characteristic. When the incident light 50 enters the polarizing plate 120 from the backlight module 400, if the incident light 50 and the reflected light 52 are regarded as the plane PLN (as shown in FIG. 1D), in the incident light 50, most of the polarized light with the polarization direction PS perpendicular to the plane PLN can pass through the polarizing plate 120 while the polarized light with the polarization direction PP parallel to the plane PLN is absorbed by the polarizing plate 120. Therefore, the image color switch film 300 can be designed according to the vertical polarized light relative to the plane PLN, and a small quantity of film layers can be used to achieve the optical characteristic. Moreover, by disposing the image color switch film 300 under the VA-LCD panel 200, the visual taste of the vertical alignment liquid crystal display module 100e can be enhanced. This is because when the vertical alignment liquid crystal display module 100e does not emit light, the image color switch film 300 disposed on the lower layer may be less likely to reflect the ambient light from the outside, and the screen that the user sees may appear fairly dark black, thereby improving the visual taste.

Figure 12:
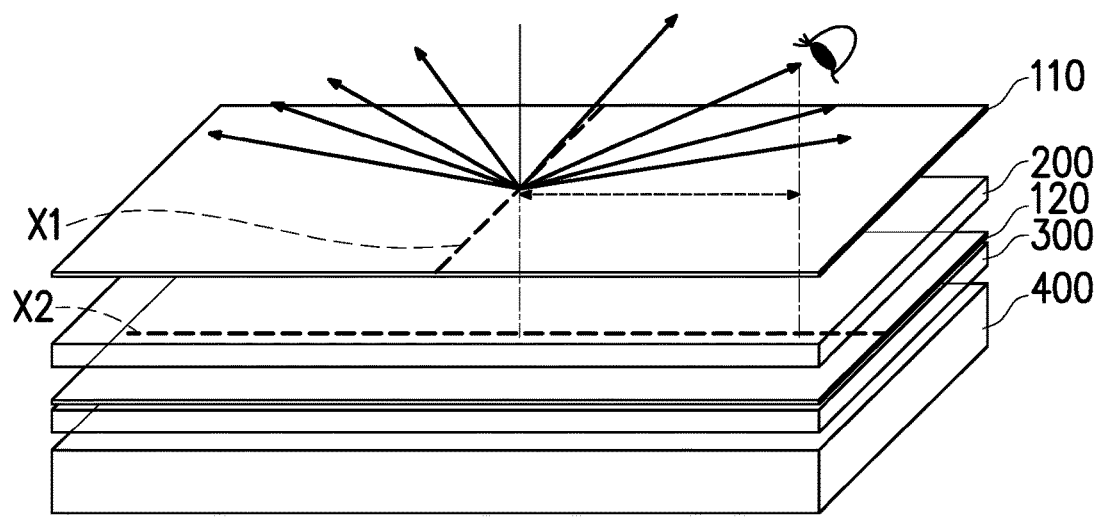
FIG. 12 is a three-dimensional layered view of a vertical alignment liquid crystal display module according to still another embodiment of the disclosure.

FIG. 12 is a three-dimensional layered view of a vertical alignment liquid crystal display module according to still another embodiment of the disclosure. Referring to FIG. 12, a vertical alignment liquid crystal display module 100f of the embodiment is similar to the vertical alignment liquid crystal display module 100e of FIG. 11A and FIG. 11B, and the differences between the two are as follows. In the vertical alignment liquid crystal display module 100e of FIG. 11A and FIG. 11B, the transmission axis X1 of the polarizing plate 110 is parallel to the long side direction of the VA-LCD panel 200, and the transmission axis X2 of the polarizing plate 120 is parallel to the short side direction of the VA-LCD panel 200. What differs is that in the vertical alignment liquid crystal display module 100f of the embodiment, the transmission axis X1 of the polarizing plate 110 is parallel to the short side direction of the VA-LCD panel 200, and the transmission axis X2 of the polarizing plate 120 is parallel to the long side direction of the VA-LCD panel 200. Accordingly, at this time, the direction of the transmission axis X2 of the polarizing plate 120 is parallel to the long side direction of the VA-LCD panel 200 (the long side direction is the horizontal direction). If the incident light 50 and the reflected light 52 are regarded as the plane PLN (as shown in FIG. 1D), in the incident light 50, most of the polarized light with the polarization direction PP parallel to the plane PLN can pass through the polarizing plate 120, while the polarized light with the polarization direction PS perpendicular to the plane PLN is absorbed, so the image color switch film 300 can be designed according to the parallel polarized light relative to the plane PLN to achieve the optical characteristic.

Figure 13:
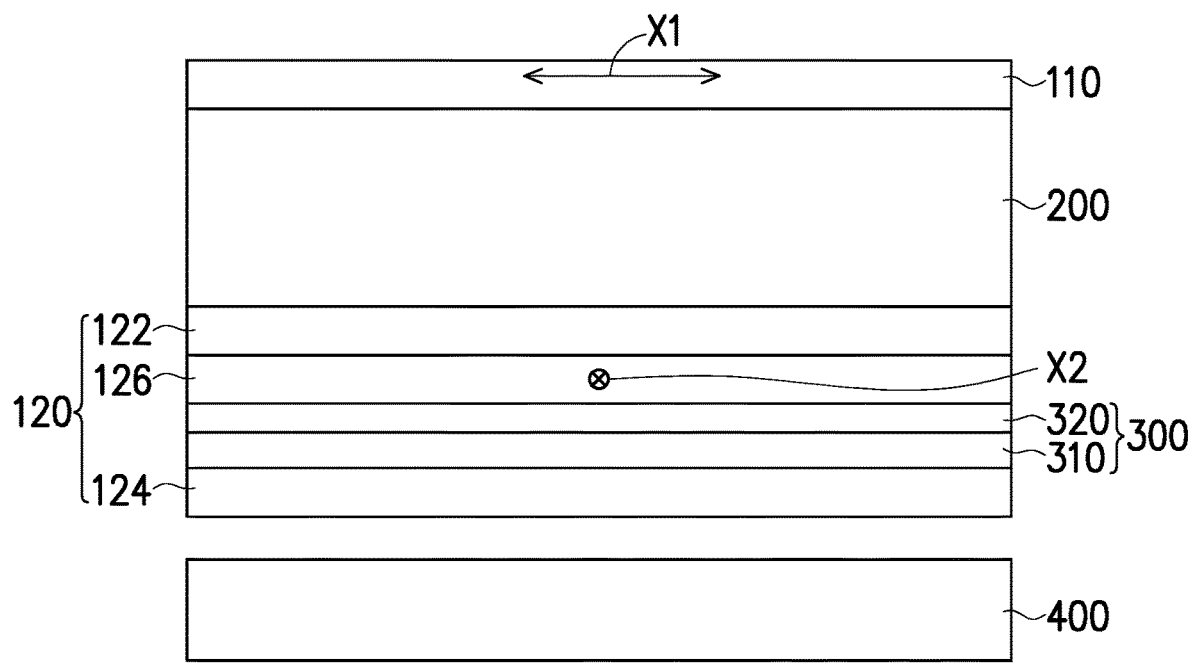
FIG. 13 is a schematic cross-sectional view of a vertical alignment liquid crystal display module according to another embodiment of the disclosure.

FIG. 13 is a schematic cross-sectional view of a vertical alignment liquid crystal display module according to another embodiment of the disclosure. Referring to FIG. 13, the vertical alignment liquid crystal display module 100g of the embodiment is similar to the vertical alignment liquid crystal display module 100e of FIG. 11A, and the difference between the two is as follows. In the vertical alignment liquid crystal display module 100g of the embodiment, the image color switch film 300 is disposed between the third transparent substrate 122 and the fourth transparent substrate 124. In FIG. 13, the image color switch film 300 is disposed on the polarizing layer 126 and the fourth transparent substrate 124 as an exemplary illustration. However, in other embodiments, the image color switch film 300 may also be disposed between the third transparent substrate 122 and the polarizing layer 126. In the embodiment, the transmission axis X2 of the polarizing layer 126 is parallel to the short side direction of the VA-LCD panel 200 (i.e., the direction into the paper surface of FIG. 13), and the transmission axis X1 of the polarizing plate 110 is parallel to the long side direction of the VA-LCD panel 200 (i.e., the direction parallel to the paper surface of FIG. 13). However, in other embodiments, the transmission axis X2 of the polarizing layer 126 may be parallel to the long side direction of the VA-LCD panel 200, and the transmission axis X1 of the polarizing plate 110 is parallel to the short side direction of the VA-LCD panel 200. Moreover, in the embodiment, the third transparent substrate 122 may also be a phase difference compensation film.

Figure 14:
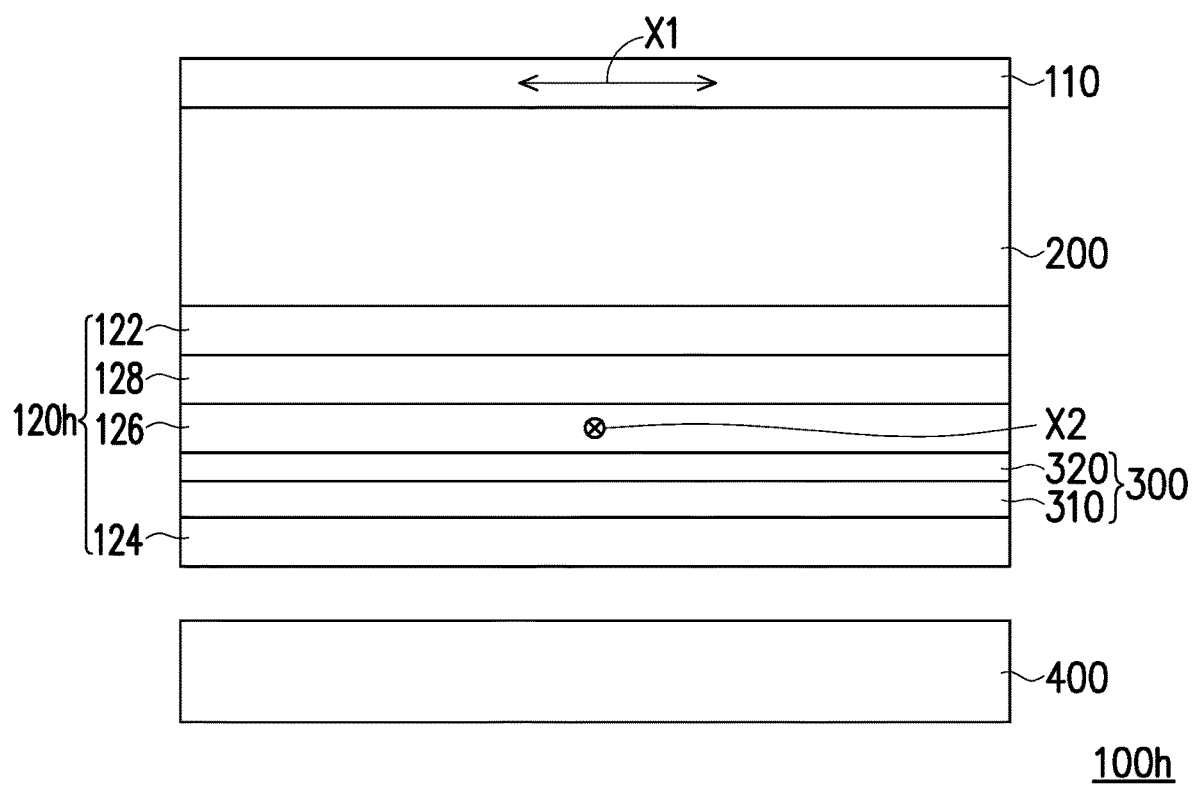
FIG. 14 is a schematic cross-sectional view of a vertical alignment liquid crystal display module according to yet another embodiment of the disclosure.

FIG. 14 is a schematic cross-sectional view of a vertical alignment liquid crystal display module according to yet another embodiment of the disclosure. Referring to FIG. 14, a vertical alignment liquid crystal display module 100h of the embodiment is similar to the vertical alignment liquid crystal display module 100g of FIG. 13, and the difference between the two is as follows. In the vertical alignment liquid crystal display module 100h of the embodiment, a polarizing plate 120h further includes a phase difference compensation film 128 disposed between the third transparent substrate 122 and the polarizing layer 126. The function and the material of the phase difference compensation film 128 are the same as the function and the material of the phase difference compensation film 118, which may not be repeated herein.

Figure 15:
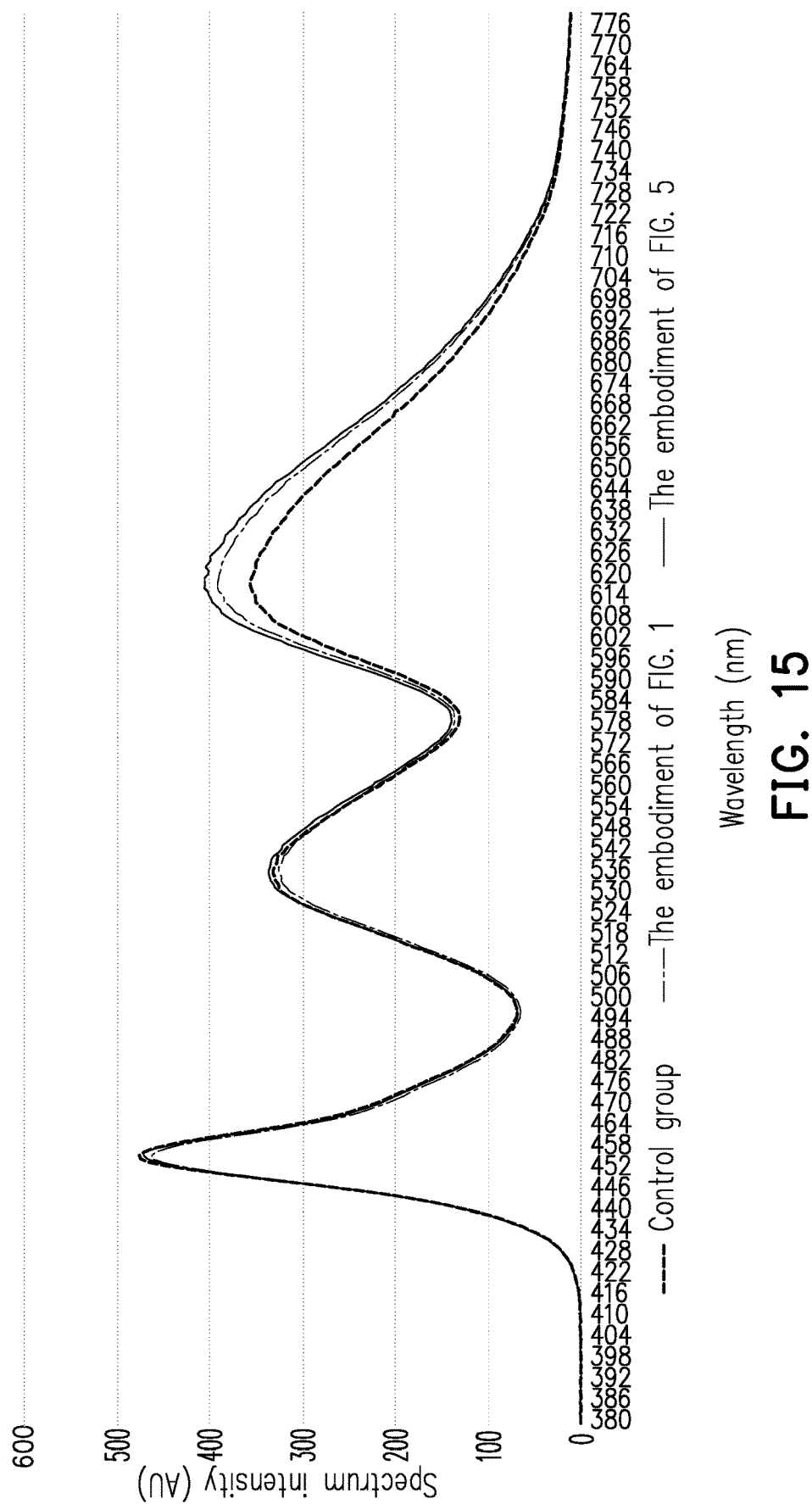
FIG. 15 illustrates actual spectra of the vertical alignment liquid crystal display module of a control group, the embodiment of FIG. 1A, and the embodiment of FIG. 5 when the red sub-pixels, the green sub-pixels, and the blue sub-pixels are all lit at a viewing angle of 60 degrees.

FIG. 15 illustrates actual spectra of the vertical alignment liquid crystal display module of a control group, the embodiment of FIG. 1A, and the embodiment of FIG. 5 when the red sub-pixels, the green sub-pixels, and the blue sub-pixels are all lit at a viewing angle of 60 degrees. In FIG. 15, the curve of the control group represents the vertical alignment liquid crystal display module without the image color switch film of the embodiment of the disclosure. According to FIG. 15, it is obvious that the spectrum intensity of the red light (the long wavelength part) of the vertical alignment liquid crystal display module 100 in the embodiment of FIG. 1A and the spectrum intensity of the red light of the vertical alignment liquid crystal display module 100b in the embodiment of FIG. 5 are significantly greater than the spectrum intensity of the red light of the control group, and this means that when the viewing angle is 60 degrees, the energy ratios of the red light and the yellow light of skin color are both increased (where the yellow light band refers to the wavelength ranging from about 570 nm to 590 nm), which effectively improves the color quality of images at large viewing angles.

In summary, in the vertical alignment liquid crystal display module of the embodiments of the disclosure, at a large viewing angle, the configuration of the image color switch film allows the average transmittance of the visible light transmission spectrum at the end of short wavelength to be less than the average transmittance of the visible light transmission spectrum at the end of long wavelength, that is allows more red light and yellow light to pass through and to refrain blue light and green light from passing through, so when the viewing angle is large, the problem of greenish white images or blueish white images can be effectively improved, thereby improving the color accuracy of skin color images. That is, the vertical alignment liquid crystal display module of the embodiments of the disclosure can effectively improve the problem of color shift at a large viewing angle. Moreover, the vertical alignment liquid crystal display technology still has the advantages of high contrast and strong color rendering at a center viewing angle. The embodiments of the disclosure can improve the color shift at a large viewing angle and retain the high contrast characteristics of the vertical alignment liquid crystal display technology, which can surpass the IPS technology and become the display technology with the superior effect of color rendering.

What is claimed is:

1. A vertical alignment liquid crystal display module, comprising:
    a vertical alignment liquid crystal display panel; and
    an image color switch film disposed above or below the vertical alignment liquid crystal display panel, wherein the image color switch film has a following optical characteristic in various viewing angle directions having included angles of 60 degrees to 75 degrees with respect to a normal of the image color switch film:
    an average transmittance of a visible light transmission spectrum of the image color switch film at an end of short wavelength is less than an average transmittance of a visible light transmission spectrum at an end of long wavelength.

2. The vertical alignment liquid crystal display module according to claim 1, wherein the image color switch film has the optical characteristic in various viewing angle directions having included angles of 45 degrees to 75 degrees with respect to the normal of the image color switch film.

3. The vertical alignment liquid crystal display module according to claim 2, wherein the image color switch film has the optical characteristic in various viewing angle directions having included angles of 30 degrees to 75 degrees with respect to the normal of the image color switch film.

4. The vertical alignment liquid crystal display module according to claim 1, wherein the image color switch film has the optical characteristic in various viewing angle directions having included angles of 60 degrees to 90 degrees with respect to the normal of the image color switch film.

5. The vertical alignment liquid crystal display module according to claim 1, wherein the image color switch film comprises at least one interference film.

6. The vertical alignment liquid crystal display module according to claim 5, wherein the at least one interference film comprises:
    a first light-transmitting film; and
    a second light-transmitting film stacked with the first light-transmitting film, wherein a refractive index of the first light-transmitting film is less than a refractive index of the second light-transmitting film.

7. The vertical alignment liquid crystal display module according to claim 6, wherein the refractive index of the first light-transmitting film is 1.6 or less, and the refractive index of the second light-transmitting film is 1.8 to 2.4.

8. The vertical alignment liquid crystal display module according to claim 6, further comprising a first polarizing plate disposed between the image color switch film and the vertical alignment liquid crystal display panel, wherein the image color switch film is disposed above the vertical alignment liquid crystal display panel.

9. The vertical alignment liquid crystal display module according to claim 8, wherein the second light-transmitting film is disposed between the first light-transmitting film and the first polarizing plate, and the refractive index of the first light-transmitting film is below 1.66.

10. The vertical alignment liquid crystal display module according to claim 8, wherein the first polarizing plate comprises:
    a first transparent substrate disposed between the image color switch film and the vertical alignment liquid crystal panel;
    a second transparent substrate disposed between the first transparent substrate and the vertical alignment liquid crystal display panel;
    a polarizing layer disposed between the first transparent substrate and the second transparent substrate; and
    a phase difference compensation film disposed between the first transparent substrate and the second transparent substrate.

11. The vertical alignment liquid crystal display module according to claim 10, wherein the phase difference compensation film is disposed between the polarizing layer and the second transparent substrate.

12. The vertical alignment liquid crystal display module according to claim 8, wherein the first polarizing plate comprises:
    a first transparent substrate disposed between the image color switch film and the vertical alignment liquid crystal panel;
    a second transparent substrate disposed between the first transparent substrate and the vertical alignment liquid crystal display panel, wherein the second transparent substrate is a phase difference compensation film; and
    a polarizing layer disposed between the first transparent substrate and the second transparent substrate.

13. The vertical alignment liquid crystal display module according to claim 8, wherein a transmission axis of the first polarizing plate is parallel to a short side direction or a long side direction of the vertical alignment liquid crystal display panel.

14. The vertical alignment liquid crystal display module according to claim 6, further comprising:
    a first transparent substrate, wherein the image color switch film is disposed between the first transparent substrate and the vertical alignment liquid crystal display panel;
    a second transparent substrate disposed between the image color switch film and the vertical alignment liquid crystal display panel;
    a polarizing layer disposed between the image color switch film and the second transparent substrate; and
    a phase difference compensation film disposed between the polarizing layer and the second transparent substrate.

15. The vertical alignment liquid crystal display module according to claim 14, wherein the refractive index of the first light-transmitting film is 1.6 or less, and the refractive index of the second light-transmitting film is 1.8 to 2.5.

16. The vertical alignment liquid crystal display module according to claim 15, wherein the refractive index of the first transparent substrate is 1.7 or less.

17. The vertical alignment liquid crystal display module according to claim 16, further comprising a surface treatment layer, wherein the first transparent substrate is disposed between the surface treatment layer and the image color switch film.

18. The vertical alignment liquid crystal display module according to claim 14, wherein a transmission axis of the polarizing layer is parallel to a short side direction or a long side direction of the vertical alignment liquid crystal display panel.

19. The vertical alignment liquid crystal display module according to claim 6, further comprising:

a first transparent substrate, wherein the image color switch film is disposed between the first transparent substrate and the vertical alignment liquid crystal display panel;

a second transparent substrate disposed between the image color switch film and the vertical alignment liquid crystal panel; and a polarizing layer, wherein the image color switch film is disposed between the polarizing layer and the second transparent substrate.

20. The vertical alignment liquid crystal display module according to claim 6, further comprising a first polarizing plate, wherein the image color switch film is disposed between the first polarizing plate and the vertical alignment liquid crystal panel, and the image color switch film is disposed above the vertical alignment liquid crystal panel.

21. The vertical alignment liquid crystal display module according to claim 6, further comprising:

a first transparent substrate, wherein the image color switch film is disposed between the first transparent substrate and the vertical alignment liquid crystal display panel;

a second transparent substrate disposed between the image color switch film and the vertical alignment liquid crystal display panel, wherein the second transparent substrate is a phase difference compensation film; and a polarizing layer disposed between the image color switch film and the second transparent substrate.

22. The vertical alignment liquid crystal display module according to claim 5, wherein the at least one interference film comprises a light-transmitting film, and a refractive index of the light-transmitting film is 1.5 to 2.5.

23. The vertical alignment liquid crystal display module according to claim 1, wherein the vertical alignment liquid crystal display panel is a multi-domain vertical alignment liquid crystal display panel.

24. The vertical alignment liquid crystal display module according to claim 1, wherein the optical characteristic further comprises that the transmittance of the visible light transmission spectrum increases from one end of the short wavelength to one end of the long wavelength.

25. The vertical alignment liquid crystal display module according to claim 1, wherein the optical characteristic further comprises that the transmittance of the visible light transmission spectrum increases first and then decreases from one end of the short wavelength to one end of the long wavelength.

26. The vertical alignment liquid crystal display module according to claim 6, further comprising a second polarizing plate, wherein the second polarizing plate is disposed between the image color switch film and the vertical alignment liquid crystal panel, or the image color switch film is disposed between the second polarizing plate and the vertical alignment liquid crystal panel, wherein the image color switch film is disposed under the vertical alignment liquid crystal display panel.

27. The vertical alignment liquid crystal display module according to claim 26, wherein a transmission axis of the second polarizing plate is parallel to a short side direction or a long side direction of the vertical alignment liquid crystal display panel.

28. The vertical alignment liquid crystal display module according to claim 6, further comprising:

a third transparent substrate disposed under the vertical alignment liquid crystal display panel;

a fourth transparent substrate, wherein the third transparent substrate is disposed between the vertical alignment liquid crystal display panel and the fourth transparent substrate; and a polarizing layer is disposed between the third transparent substrate and the fourth transparent substrate, wherein the image color switch film is disposed between the third transparent substrate and the fourth transparent substrate.

29. The vertical alignment liquid crystal display module according to claim 28, wherein a transmission axis of the polarizing layer is parallel to a short side direction or a long side direction of the vertical alignment liquid crystal display panel.

30. The vertical alignment liquid crystal display module according to claim 28, wherein the third transparent substrate is a phase difference compensation film.

31. The vertical alignment liquid crystal display module according to claim 28, further comprising a phase difference compensation film disposed between the third transparent substrate and the polarizing layer.

* * * * *